(12) United States Patent
Kumar et al.

(10) Patent No.: US 11,409,443 B2
(45) Date of Patent: Aug. 9, 2022

(54) INTELLIGENT MEMORY WEAR LEVELING

(71) Applicant: Western Digital Technologies, Inc., San Jose, CA (US)

(72) Inventors: Ravi Kumar, Redwood City, CA (US); Deepanshu Dutta, Fremont, CA (US); Niles Yang, Mountain View, CA (US); Mark Shlick, Ganey-Tikva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/177,629

(22) Filed: Feb. 17, 2021

(65) Prior Publication Data

US 2022/0171541 A1   Jun. 2, 2022

Related U.S. Application Data (60) Provisional application No. 63/119,933, filed on Dec. 1, 2020.

(51) Int. Cl.
*G06F 3/06* (2006.01)

(52) U.S. Cl.
CPC ............ *G06F 3/0616* (2013.01); *G06F 3/064* (2013.01); *G06F 3/0655* (2013.01); *G06F 3/0679* (2013.01)

(58) Field of Classification Search
CPC ...... G06F 3/064; G06F 3/0679; G06F 3/0655; G06F 3/0616
USPC ................................................ 711/154, 103
See application file for complete search history.

(56) References Cited

U.S. PATENT DOCUMENTS

| | | | |
|---|---|---|---|
| 6,789,174 B2* | 9/2004 | Konishi | G06F 13/4243 711/170 |
| 10,026,486 B1 | 7/2018 | Dutta et al. | |
| 10,229,744 B2 | 3/2019 | Dutta et al. | |
| 2015/0347027 A1* | 12/2015 | Lu | G11C 8/04 711/103 |
| 2019/0324670 A1* | 10/2019 | Lee | G06F 3/064 |

FOREIGN PATENT DOCUMENTS

| | | |
|---|---|---|
| JP | 2021510887 A | 4/2021 |
| WO | 2019182747 A1 | 9/2019 |

* cited by examiner

*Primary Examiner* — Hashem Farrokh
(74) *Attorney, Agent, or Firm* — Michael Best & Friedrich LLP (57) ABSTRACT

A data storage device including, in one implementation, a non-volatile memory device and a controller coupled to the non-volatile memory device. The non-volatile memory device includes a memory block. The controller is configured to receive a cycle operation request and perform a wear-level mitigation operation in response to receiving the cycle operation request. To perform the wear-level mitigation operation, the controller is configured to determine a read state condition of the memory block, perform the requested cycle operation, and increment a cycle count of the memory block by a value based on the determined read state condition of the memory block. The first read state of the memory block and the second read state of the memory block are based on a wordline voltage that is associated with the memory block.

20 Claims, 6 Drawing Sheets

INTELLIGENT MEMORY WEAR LEVELING

CROSS-REFERENCE TO RELATED APPLICATION

This Applications claims priority to and the benefit of U.S. Provisional Patent Application No. 63/119,933, filed on Dec. 1, 2020, the entire contents of which is incorporated herein by reference.

BACKGROUND

This application relates generally to memory devices, and more particularly, to a controller that mitigates wear on memory blocks due to cycling operations when a memory block is in a second read state.

Semiconductor memory devices have memory cells that are used to store data. The memory cells may be formed with a charge-trapping material can be used to store a charge that represents a data state. The charge-trapping material can be arranged vertically in a three-dimensional (3D) stacked memory structure, or horizontally in a two-dimensional (2D) memory structure. One example of a 3D memory structure is a Bit Cost Scalable (BiCS) architecture, which comprises a stack of alternating conductive and dielectric layers.

The memory cells may be arranged in strings, for instance, where select gate transistors are provided at the ends of the string to selectively connect a channel of the string to a source line or bit line. When the memory cells are programmed or written, the data can be read back in a read operation. A read operation can involve applying a series of read voltages to a word line (WL) while sensing circuitry determines whether cells connected to the WL are in a conductive or non-conductive state. If a cell is in a non-conductive state, the Vth of the memory cell exceeds the read voltage. The read voltages are set at levels that are expected to be between the threshold voltage levels of adjacent data states.

However, the Vth of a memory cell can vary depending on when the read operation occurs. For example, the Vth can vary in the memory cells depending on a coupled up state of the WLs when the read operation occurs. A "first read" condition can be defined in which the WLs are not coupled up, and a "second read" condition can be defined in which the WLs are coupled up. That is, after a first read operation, parasitic capacitances are built up, which place the WLs in the second read condition. The memory cells will gradually transition from the second read condition to the first read condition over time, e.g., one hour, as the WLs are discharged. Inadequate time between reads and/or inadequate grounding paths for the wordline voltage may increase the time required to transition from the second read condition to the first read condition.

The memory cells can be in the first read condition after a power on event. For example, when the memory device is powered up, an operation that checks for bad blocks may be performed. This operation involves applying 0 V or other low voltage to the WLs. As a result, any coupling up of the WL voltages is discharged. The memory cells can be in the second read condition when a read occurs shortly, e.g., seconds or minutes, after a last sensing operation.

When a read operation occurs, it may not be known if the cells are in the first or second read condition, or perhaps somewhere in between these two conditions. One approach is to track the elapsed time since a power on event or a previous sensing operation. However, this elapsed time may not accurately indicate whether the word lines are coupled up, or the extent of the coupling up, since other factors such as environmental factors and process variations may be relevant.

It is known to measure or estimate the life of a memory by tracking memory usage or wear. Each operation performed on a memory cell can decrease the life of the cell. For example, a read operation on a memory cell in the first read state causes a stress on the memory cell due to the relatively large change in voltage and noise that effect the memory cell. If the memory cell is in the second read state, a different amount of stress is placed on the cell because of the charge that may escape from the trap state. It would be advantageous to be able to accurately calculate wear level.

SUMMARY

Performing a cycling operation of the memory block when the memory block is in the second read state increases wear on the memory block over time. By cycling the memory block when the bias voltage is lower, e.g. in a first read state, the lifespan of the memory block may be increased and the wear associated with the second read state may be accounted for or reduced.

One embodiment of the present disclosure includes a data storage device including a non-volatile memory device including a memory block, and a controller coupled to the non-volatile memory device. The controller is configured to receive a cycle operation request and perform a wear-level mitigation operation in response to receiving the cycle operation request. To perform the wear-level mitigation operation, the controller is further configured to determine whether the memory bloke is in the first read state or the second read state. The controller is also configured to perform the requested cycle operation and increment a cycle count of the memory block by a first value in response to determining that the memory block is in the first read state, and perform the requested cycle operation of the memory block and increment the cycle count of the memory block by a second value in response to determining that the memory block is in the second read state. The first read state of the memory block and the second read state of the memory block are based on a wordline voltage that is associated with the memory block.

In another embodiment of the present disclosure, a method performed by a controller coupled to a non-volatile memory device receives a cycle operation request and performs a wear-level mitigation operation in response to receiving the cycle operation request. The wear-level mitigation operation includes determining whether the memory block is in the first read state or the second read state, performing the requested cycle operation and increment a cycle count of the memory block by a first value in response to determining that the memory block is in the first read state. The wear-level mitigation operation also includes performing the requested cycle operation of the memory block and increment the cycle count of the memory block by a second value in response to determining that the memory block is in the second read state. The first read state of the memory block and the second read state of the memory block are based on a wordline voltage that is associated with the memory block.

In one embodiment of the of the present disclosure, an apparatus is provided. The apparatus includes means for receiving a request to cycle a memory block, wherein the memory block is within a non-volatile memory device of a data storage device. The apparatus also includes means for performing a wear-level mitigation operation The means to perform the wear-level mitigation operation is configured to determine whether the memory block is in the first read state or the second read state, and perform the requested cycle operation of the memory block and increment a cycle count of the memory block by a first value in response to determining that the memory block is in the first read state. The means to perform the wear-level mitigation operation is also configured to perform the requested cycle operation of the memory block and increment the cycle count of the memory block by a second value in response to determining that the memory block is in the second read state. The first read state of the memory block and the second read state of the memory block are based on a wordline voltage that is associated with the memory block.

Various aspects of the present disclosure provide for improvements in memory devices. For example, accounting for cycling events when a memory block is in a second read state can aid in properly managing wear levels between memory blocks in a memory device. Additionally, forcing a memory block into a first read state prior to a cycling operation extends the lifespan of a memory block. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, etc.

Figure 1:
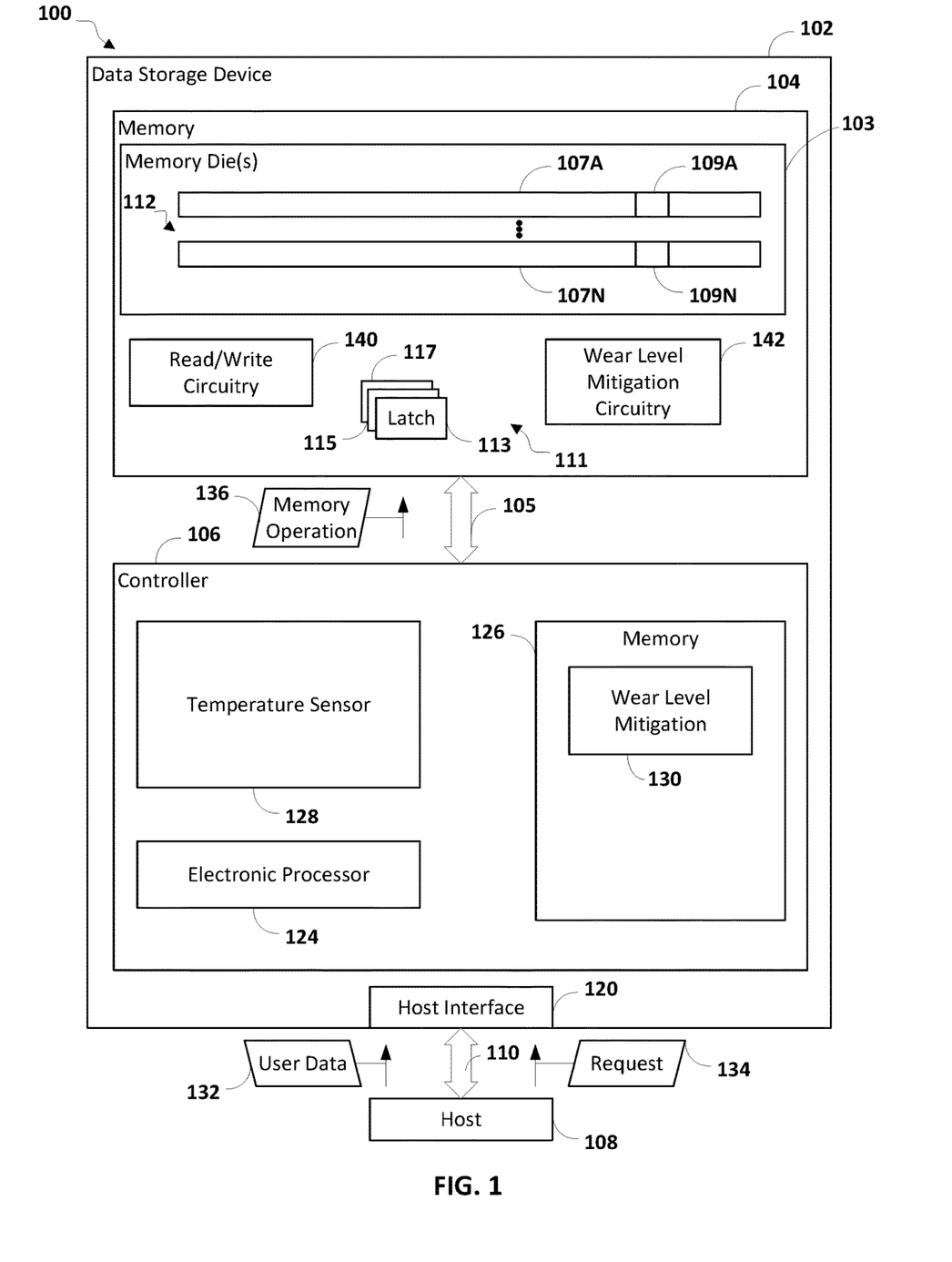
FIG. 1 is block diagram of one example of a system including a data storage device, according to some embodiments.

FIG. 1 is a block diagram of one example of a system 100 that includes wear level mitigation, in accordance with some embodiments of the disclosure. In the example of FIG. 1, the system 100 includes a data storage device 102 in communication with a host device 108. The data storage device 102 includes a memory device 104 (e.g. non-volatile memory) that is coupled to a controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled via a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 108 via the communication path 110, such as a wired communication path and/or a wireless communication path. For example, the data storage device 102 may include an interface 120 (e.g., a host interface) that enables communication via the communication path 110 between the data storage device 102 and the host device 108, such as when the interface 120 is communicatively coupled to the host device 108.

The host device 108 may include an processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data, such as user data 132, to be stored at the memory device 104 or to request data to be read from the memory device 104. The host device 108 may include a mobile smartphone, a music player, a video player, a gaming console, an electronic book reader, a personal digital assistant (PDA), a computer, such as a laptop computer or notebook computer, any combination thereof, or other suitable electronic device.

The host device 108 communicates via a memory interface that enables reading from the memory device 104 and writing to the memory device 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the memory device 104 in accordance with any other suitable communication protocol.

The memory device 104 of the data storage device 102 may include a non-volatile memory (e.g., NAND, BiCS family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies 103. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory device 104 may include support circuitry, such as read/write circuitry 140 and wear level mitigation circuitry 142 to support operation of the one or more memory dies 103. Although depicted as a single component, the read/write circuitry 140 may be divided into separate components of the memory device 104, such as read circuitry and write circuitry. The read/write circuitry 140 may be external to the one or more memory dies 103 of the memory device 104. Alternatively, one or more individual memory dies may include corresponding read/write circuitry that is operable to read from and/or write to storage elements within the individual memory die independent of any other read and/or write operations at any of the other memory dies. Similarly, the wear level mitigation circuitry 142 may be external to the one or more memory dies 103 and to the memory device 104. For example, the wear level mitigation circuitry 142 may be embodied in the controller 106 as separate hardware circuitry or firmware executed by the processor 124. Alternatively, one or more individual memory dies may include corresponding wear level mitigation circuitry that is operable perform wear level mitigation functions, described below, within the individual memory die independent of any wear level mitigation operations at any of the other memory dies. In some examples, one or more wear level operations may be performed using the wear level mitigation circuitry 142. The memory device 104 may further include one or more latches (e.g., a set of latches 111 including latches 113, 115, and 117).

The wear level mitigation circuitry 142 may be formed using logic gates such as AND, OR, XOR, and NOT gates, or programmable logic gates. In other examples, the wear level mitigation circuitry 142 may be omitted from the memory device 104, and operations described with reference to the wear level mitigation circuitry 142 may be performed by the read/write circuitry 140. In still further examples, the wear level mitigation circuitry 142 may be omitted from the memory device 104, and operations described with reference to the wear level mitigation circuitry 142 may be performed by the controller 106.

The controller 106 is coupled to the memory device 104 (e.g., the one or more memory dies 103) via a bus 105, an interface (e.g., interface circuitry), another structure, or a combination thereof. For example, the bus 105 may include multiple distinct channels to enable the controller 106 to communicate with each of the one or more memory dies 103 in parallel with, and independently of, communication with the other memory dies 103.

The controller 106 is configured to receive data and instructions from the host device 108 and to send data to the host device 108. For example, the controller 106 may send data to the host device 108 via the interface 120, and the controller 106 may receive data from the host device 108 via the interface 120. The controller 106 is configured to send data and commands (e.g., the memory operation 136, which may be a cycle operation of a memory block of the memory device 104) to the memory device 104 and to receive data from the memory device 104. For example, the controller 106 is configured to send data and a program or write command to cause the memory device 104 to store data to a specified address of the memory device 104. The write command may specify a physical address of a portion of the memory device 104 (e.g., a physical address of a word line of the memory device 104) that is to store the data.

The controller 106 is configured to send a read command to the memory device 104 to access data from a specified address of the memory device 104. The read command may specify the physical address of a region of the memory device 104 (e.g., a physical address of a word line of the memory device 104). The controller 106 may also be configured to send data and commands to the memory device 104 associated with background scanning operations, garbage collection operations, and/or wear-leveling operations, or other suitable memory operations.

The controller 106 may include an processor 124, a memory 126, and other associated circuitry such as a temperature sensor 128. The memory 126 may be configured to store data and/or instructions that may be executable by the processor 124. The memory 126 may include wear level mitigation commands 130. The wear level mitigation commands 130 may be a hardware circuit or instructions that are executable by the processor 124.

The controller 106 may send the memory operation 136 (e.g., a read command) to the memory device 104 to cause the read/write circuitry 140 to sense data stored in a storage element. For example, the controller 106 may send the read command to the memory device 104 in response to receiving a request for read access from the host device 108. In response to receiving the read command, the memory device 104 may sense the storage element 107A (e.g., using the read/write circuitry 140) to generate one or more sets of bits representing the stored data.

The temperature sensor 128 is configured to detect or determine a temperature of the data storage device 102 and/or the memory device 104. In some embodiments, a temperature of each memory block 112 can be determined by the temperature sensor 128. In other embodiments, a single temperature of the data storage device 102 is determined by the temperature sensor 128. The temperature sensor 128 is configured to provide the determined temperature information to the processor 124. While the temperature sensor 128 of FIG. 1 is shown as part of the controller 106, it is understood that one or more temperature sensors may be located within the memory device 104 to provide temperature values of one or more portions of the memory device 104.

When reading one or more selected wordlines of a memory block, a wordline voltage is applied to the wordlines of the block to turn-on the memory cells and avoid channel cutoff. Current memory systems assume that all wordlines are always written, and thus apply a fixed wordline voltage during a read operation. The wordline voltage is applied during every read as a threshold voltage ("Vt") at the wordline, and subsequently removed after the read is completed, resulting in a first read state of the threshold voltage Vt. In some flash memory types (e.g. NAND) memory, the threshold voltage Vt creeps up after the read operation, resulting in a second read state of the threshold voltage Vt. In some embodiments, the second read state of the threshold voltage Vt may be approximately 4V. However, threshold voltages of more than 4V and less than 4V are contemplated.

Figure 2:
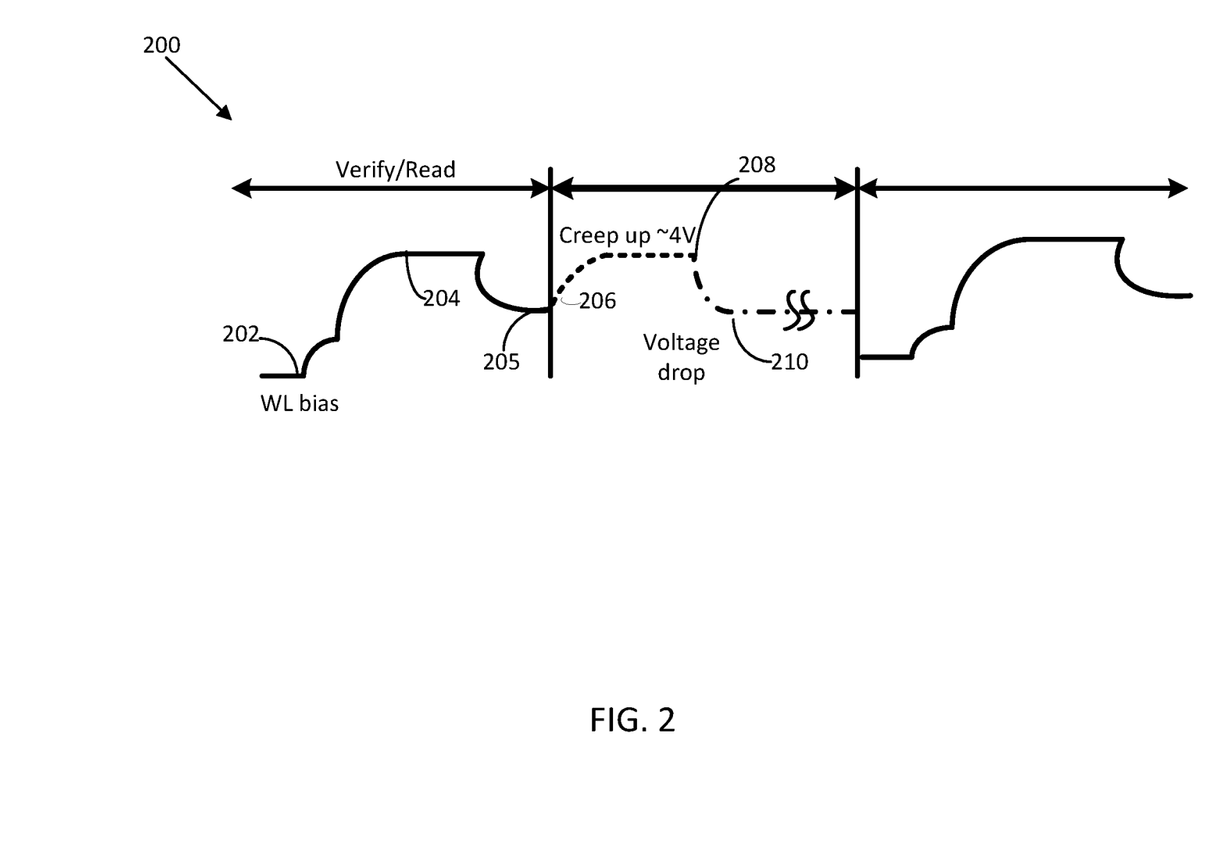
FIG. 2 is a diagram illustrating example wordline bias voltages during a read operation, according to some embodiments.

Turning now to FIG. 2, a graph illustrating an example of a typical NAND read operation 200 is shown, according to some embodiments. As shown in FIG. 2, a wordline voltage is applied to a wordline within a memory block, such as memory block 112, during a read operation causing the voltage to rise above a baseline voltage 202. After applying the wordline voltage, the threshold voltage (Vth) applied to the wordline reaches a first level 204, and subsequently drops off as the read operation is completed, dropping to a first read state voltage level 205. In one embodiment, the first read state voltage level is approximately 0V. However, voltage levels between 0V and 3V are also contemplated. The threshold voltage then begins to rise at 206, causing the wordline to be in the second read state as the voltage reaches a peak voltage at 208. As shown in FIG. 2, the threshold begins to drop after a period of time, until reaching the first read state (e.g. 0V) at 210. The period of time for the threshold voltage to fall below a second read state threshold may depend on a variety of factors, such as temperature and process variations. Generally, lower temperatures require longer periods of time for the threshold voltage to fall below the second read state threshold. Specifically, at high temperatures the time period for the threshold voltage to fall below a second read state level can be on the order of minutes. For example, at 85° C. the threshold voltage in the second read state can fall below the second read state voltage threshold in two minutes. In contrast, at lower temperatures (e.g., below 55° C.) the time period for the threshold voltage to fall below the second read state level can be on the order of hours. For example, at 55° C. the time period for the threshold voltage to fall below the second read state is approximately 2-3 hours, while at 25° C. the time period for the threshold to fall below the second read state can be approximately 15 hours.

Normally during a programming cycle (erase/program) of a memory block, there is expected wear on the memory block that may be manifested in the form of a failed bit count ("FBC") or error rate over time. Generally, the number of cycles for a given memory block is monitored, such as by the processor 124, and stored, such as in the memory 126. Based on the number of cycles ("cycle count"), the processor 124 can distribute data among different memory blocks to ensure that the different memory blocks wear evenly. For example, if the average life of a memory block is 2000 cycles, the processor 124 is configured to distribute which memory blocks are programmed to prevent some memory blocks from reaching 2000 cycles, while other memory blocks undergo far fewer cycles as the cycle count may not accurately reflect wear on the memory blocks.

Figure 3:
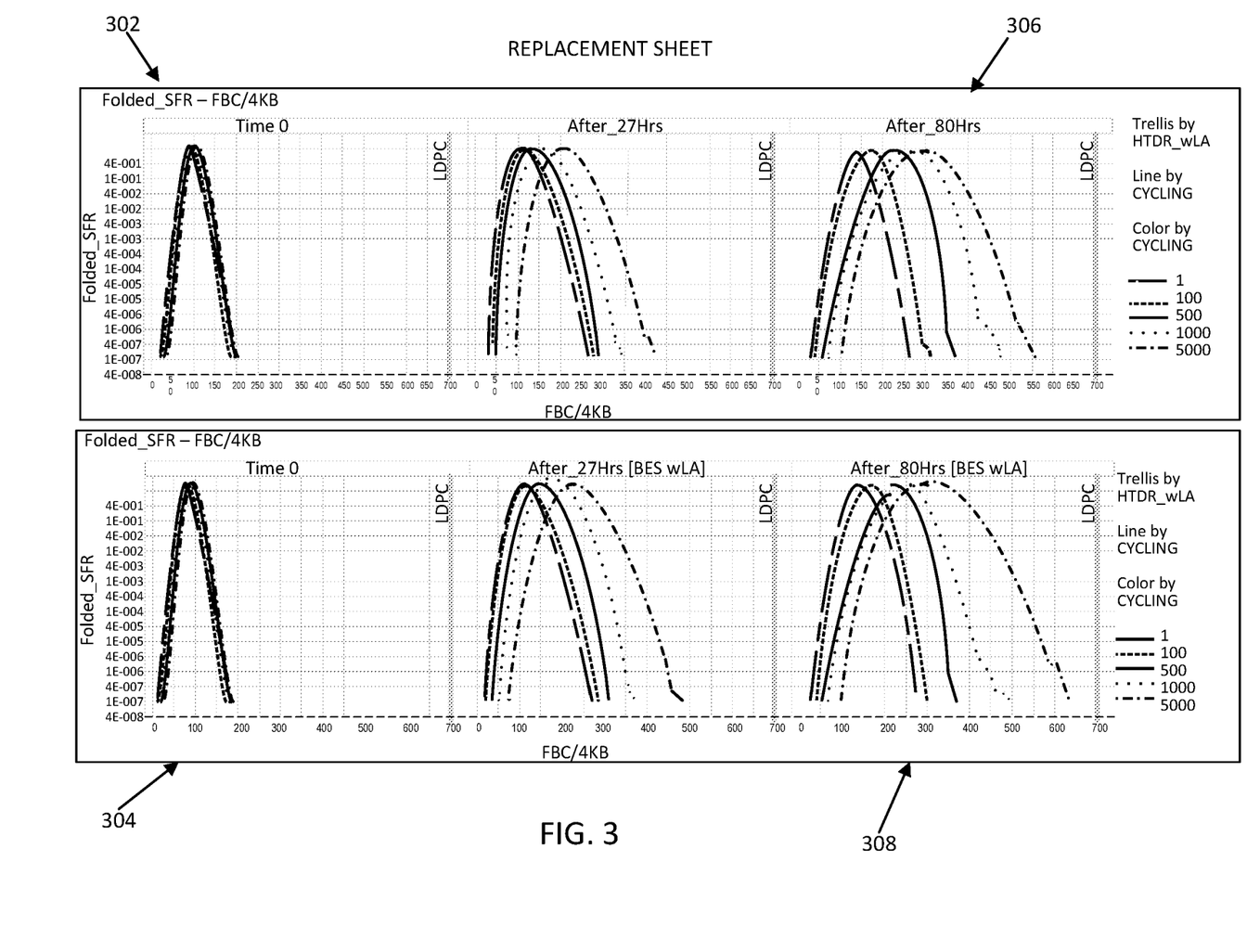
FIG. 3 includes multiple data plots showing the effects on a memory block based on first and second read state cycling operations.

It has been observed that when a memory block is cycled while the memory block (or associated wordlines) is in the second read state, as described above, the expected life span of the memory block is reduced more so than when the memory block is cycled when the memory block is in the first read state. This is shown in more detail in FIG. 3, which shows a failed bit count per 4 kb of memory when the memory blocks are cycled in the first read state (e.g. low threshold voltage) 302 versus failed bit count per 4 kb of memory when the memory blocks are cycled in the second read state 304. As shown in data plot 306, after 2000 cycles the FBC per 4 kb is approximately 560 bits for the memory device cycled when in the first read state. In contrast, as shown in data plot 308, after 2000 cycles the FBC per 4 kb is approximately 650 bits for the memory device cycled when in the second read state, showing approximately a 15% increase in failed bits over the memory block cycled when in the first read state. Thus, constant cycling of memory blocks when in the second read state can lead to premature failure of memory blocks over time. This can result in some memory blocks reaching their end-of-life ("EOL") sooner than anticipated. Moreover, the present disclosure may increase the life of the memory block with the processes described herein.

Figure 4:
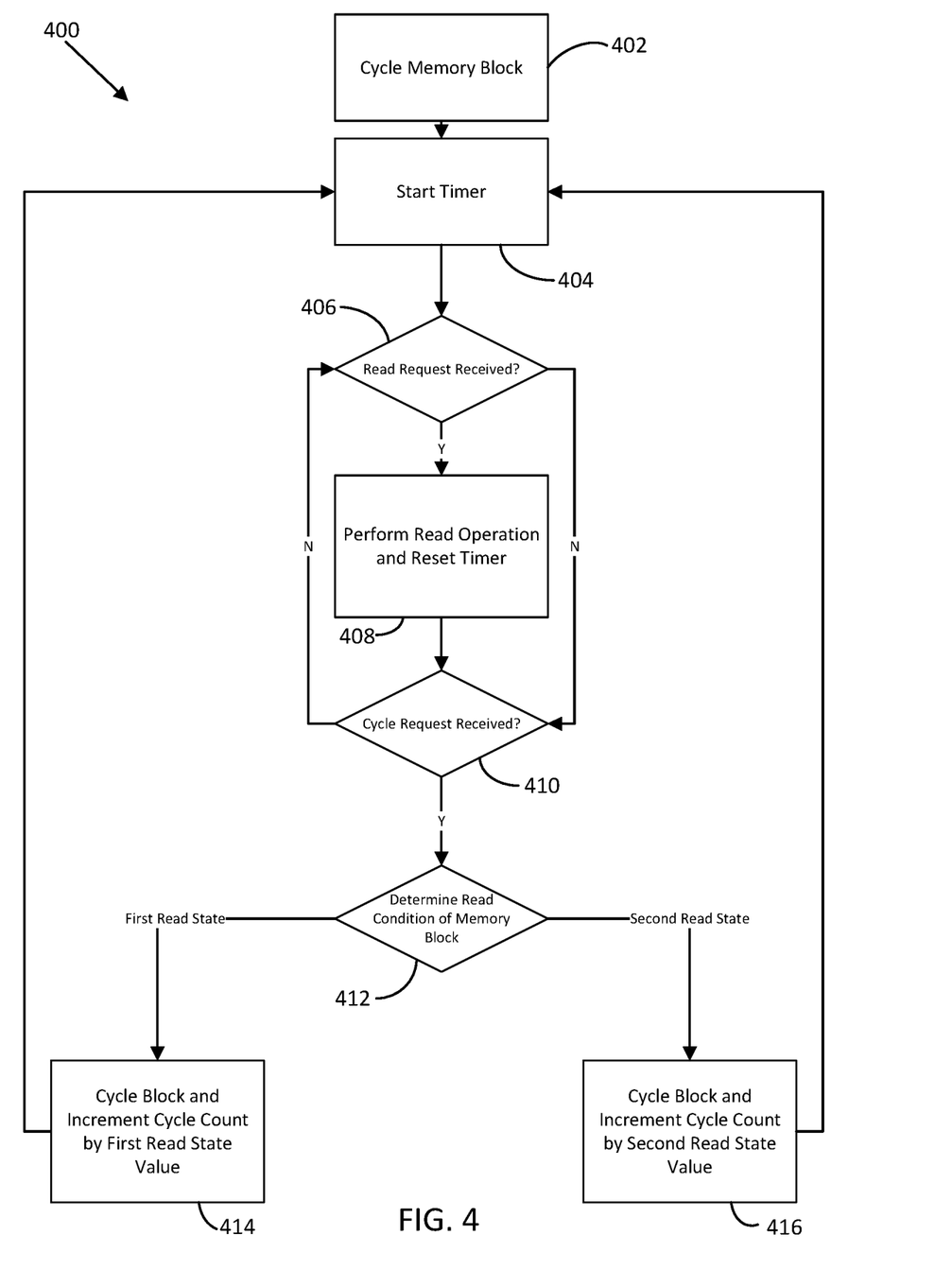
FIG. 4 is a flow chart illustrating a process for accounting for second read state cycling operations, according to some embodiments.

Turning now to FIG. 4, a process or method 400 for intelligently managing wear leveling is described, according to some embodiments. It is understood that the process 400 can be stored in a memory, such as memory 126 and wear level mitigation 130, and executed by a processor, such as processor 124. However, it is contemplated that some or all of the process 400 may be performed on the memory device 104, such as via the wear level mitigation circuitry 142 and/or the read/write circuitry 140. Accordingly, while the process 400 is described in regards to the controller 106 and its associated components described above, it is contemplated that the process 400 may be at least partially performed by the memory device 104. Further, while the process 400 is described in regards to a single memory block 112, it is understood that the process 400 may be applied to multiple memory blocks within a data storage device.

At block 402, a memory block, such as memory block 112 described above, is cycled. For purposes of this disclosure, cycling is understood to mean an erasing of the data within a memory block. Cycling can further include writing new data to a memory block after the erasing process is completed. Thus, cycling is understood to mean an erase and program operation of a given memory block. Subsequent to the memory block 112 being cycled at block 402, a timer is started at block 404. In one embodiment, the processor 124 controls the timer. In other embodiments, the timer is part of the processor 124 or the processor 124 can record a time (e.g., a time stamp value) associated with the cycle operation performed at block 402.

At block 406, the processor 124 determines whether a read request has been received for the memory block 112. In response to determining that a read request for the memory block 112 was received, the read of the memory block 112 is performed and the timer is reset at block 408. In some embodiments, the processor 124 can record a time (e.g. a time stamp value) associated with the read operation performed at block 408.

Upon resetting the timer, the processor 124 determines whether a cycle request for the memory block 112 has been received at block 410. Additionally, in response to determining that no read request was received at block 406, the processor 124 also determines if a cycle request is received at block 410. As described above, a cycle request is a request to erase or program the memory block 112. In response to determining that a cycle request was not received at block 410, the processor 124 again determines if a read request was received at block 406.

In response to determining that a cycle request was received, the processor 124 determines a read state of the memory block 112 at block 412. For example, the processor 124 determines whether the memory block 112 is in a first read state or a second read state. In one embodiment, the processor 124 determines a read state of the memory block 112 based on the time value of the timer. In other embodiments, the processor 124 can determine a read state of the memory block 112 based on a time value determined based on a time period between a recorded time of the last read operation (e.g. a time stamp) and a current time. For example, in response to the time value exceeding a predetermined time value, the processor 124 determines that the memory block 112 is in a first read state. However, in response to the time value not exceeding the predetermined time value, the processor 124 determines that the memory block 112 is in a second read state. In some embodiments, the predetermined time value can be 10 minutes. However, predetermined time values of more than 10 minutes or less than 10 minutes are also contemplated. In still further examples, the processor 124 can determine a read state of the memory block 112 using other functions, such as determining a control gate voltage of one or more wordlines within the memory block 112 to determine if the control gate voltages exceed a first read state value.

In other embodiments, the processor 124 determines a read state of the memory block 112 based on the time value of the timer in combination with a temperature value of the data storage device 102. The temperature value can be provided by the temperature sensor 128, described above. In one embodiment, the processor 124 determines whether the timer value exceeds a temperature adjusted time value. As described above, temperature affects the time required for a memory block 112 to transition from the second read state to the first read state (i.e., lower temperatures increase the transition time). Thus, the processor 124 can be configured to determine a time value associated with the memory block 112 being in a second read state after a read state based on a detected temperature. For example, where the data storage device 102 has a determined temperature of 85° C., the time associated with the memory block 112 being in a second read state can be 2 minutes. In contrast, where the data storage device 102 has a determined temperature of 55° C., the time associated with the memory block 112 being in a second read state can be 3 hours. The second read state time continues to increase as the temperature of the memory device decreases. Thus, for a data storage device 102 having a temperature of 85° C. or greater, the processor 124 determines that the memory block 112 is in a second read state where the timer indicates a time of less than 2 minutes has passed since the last read operation was performed on the memory block 112. In contrast, for a data storage device 102 having a temperature of 55° C., the processor 124 determines that the memory block 112 is in a second read state where the timer indicates a time of less than 3 hours has passed since the last read operation was performed on the memory block 112. The processor 124 can further extrapolate times associated with being in a second read state for temperatures less than 55° C. It is understood that the above temperature/time examples are for illustrative purposes, and that various time/temperature correlations are contemplated. One skilled in the art would understand that different memory devices having different materials, different transistor structures, different packages, etc., can have different time/temperature correlations for determining when a given memory block transitions from a second read state to a first read state.

In still further examples, the processor 124 can use other data or processes to determine whether the memory block 112 is in the first read state or the second read state. For example, the processor 124 can be configured to receive data indicating the threshold voltage for the wordlines within the memory block 112, thereby indicating whether the memory block 112 is in the first read state or the second read state.

In response to determining that the memory block 112 is in the first read state, the processor 124 completes the requested cycle operation and increments a cycle counter associated with the memory block 112 by a first read state value one (e.g., "1") at block 414. As described above, the cycle counter is a count of the number of cycle operations performed on a specific memory block. The timer is then started again at block 404. In response to determining that the memory block 112 is in the second read state, the memory block 112 is cycled and the cycle counter associated with the memory block 112 is incremented by a second read state adjustment value at block 416. In one embodiment, the second read state adjustment value is 1.2. This reflects a 20% increase in wear associated with cycling a memory block while the memory block is in the second read state. However, second read state adjustment values of more than 1.2 or less than 1.2 are also contemplated. For example, the second read state adjustment values can be determined based on memory type, memory architecture, silicon structure, transistor architecture, etc. Therefore, the second read state adjustment value can be set for a specific memory device type and is understood not to be limited to the memory devices described herein. Once the memory block 112 is cycled at block 416, the timer is started again at block 404.

By adjusting the cycle count where the memory block 112 is cycled while in a second read state, the processor 124 can more accurately determine wear on a given memory block, and utilize that data when performing one or more wear leveling operations to level wear across multiple memory blocks within the data storage device 102. The cycle count data can be stored in a memory, such as memory 126.

Figure 5:
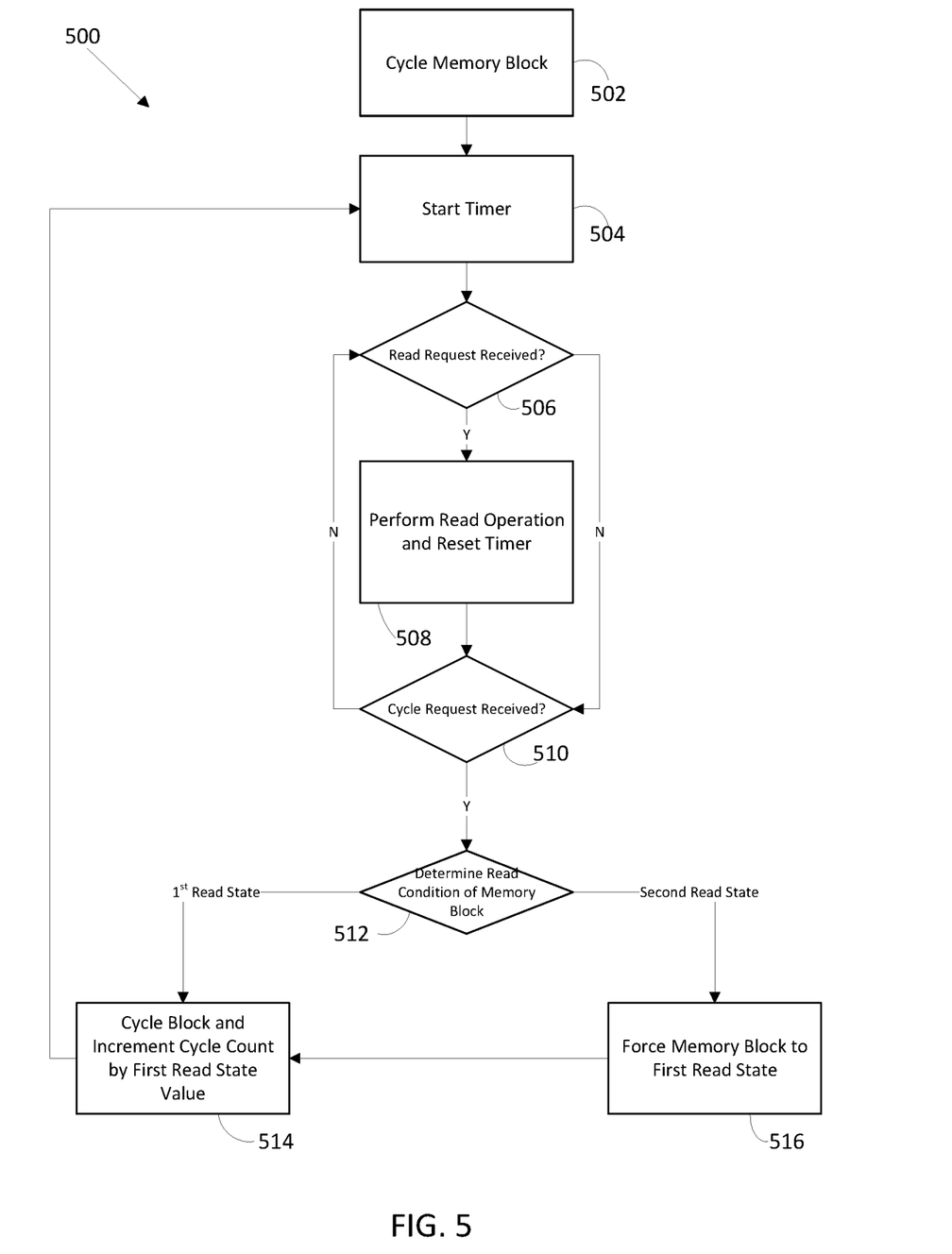
FIG. 5 is a flow chart illustrating a process for forcing a memory block from a second read state to a first read state, according to some embodiments.

Turning now to FIG. 5, a process or method 500 showing an alternative process for intelligently managing wear levels across memory blocks is shown, according to some embodiments. Process 500 can be used in lieu of, or in conjunction with, process 400, described above. For example, process 500 can be used once the memory blocks of the data storage device 102 are approaching their end of life, to prevent accelerating wear from performing cycling operations of a memory block while the memory block is in the second read state. In other examples, the process 500 can be used when the temperature of the memory device is below a threshold temperature (e.g. 55° C.) due to the longer transition times from a second read state to a first read state. While 55° C. is used as an example, it is understood that process 500 can be used in lieu of process 400 for temperatures below 55° C. or above 55° C. Furthermore, in some embodiments the process 500 is stored in a memory, such as memory 126 and wear level mitigation 130, and executed by a processor, such as the processor 124. However, in other examples, the process 500 is stored and/or performed on the memory device 104, such as via the wear level mitigation circuitry 142 and/or the read/write circuitry 140. In still further examples, the process 500 may be performed by a combination of the controller 106 and the memory device 104 (e.g., via the wear level mitigation circuitry 142 and/or the read/write circuitry 140).

At block 502, a memory block, such as memory block 112 described above, is cycled. Subsequent to the memory block 112 being cycled at block 502, a timer is started at block 504. In one embodiment, the processor 124 controls the timer. At block 506, the processor 124 determines whether a read request has been received for the memory block 112. In response to determining that a read request for the memory block 112 was received, the read of the memory block is performed and the timer is reset at block 508.

Upon resetting the timer, the processor 124 determines whether a cycle request for the memory block 112 has been received at block 510. Additionally, in response to determining that no read request was received at block 506, the processor 124 also determines if a cycle request is received at block 510. As described above, a cycle request is a request to erase or program the memory block 112. In response to determining that a cycle request was not received at block 510, the processor 124 again determines if a read request was received at block 506.

In response to determining that a cycle request was received, the processor 124 determines a read state of the memory block 112 at block 512. For example, the processor 124 determines whether the memory block 112 is in a first read state or a second read state. In one embodiment, the processor 124 determines a read state of the memory block 112 based on the time value of the timer. For example, if the timer indicates a time value that exceeds a predetermined time value, the processor 124 determines that the memory block 112 is in a first read state. However, if the timer indicates a time value that does not exceed the predetermined time value, the processor 124 determines that the memory block 112 is in a second read state. In some embodiments, the predetermined time value can be 10 minutes. However, predetermined time values of more than 10 minutes or less than 10 minutes are also contemplated.

In other embodiments, the processor 124 determines a read state of the memory block 112 based on the time value of the timer in combination with a temperature value of the data storage device 102, as described above. In still further examples, the processor 124 can use other data or processes to determine whether the memory block 112 is in the first read state or the second read state. For example, the processor 124 can be configured to receive data indicating the threshold voltage for the wordlines within the memory block, thereby indicating whether the memory block is in the first read state or the second read state.

In response to determining that the memory block 112 is in the first read state, the processor 124 completes the requested cycle operation and increments a cycle counter associated with the memory block by a first read state value (e.g., "1") at block 514. The timer is then started again at block 504. In response to determining that the memory block 112 is in the second read state, the processor 124 forces the memory block 112 into the first read state at block 516. In one embodiment, the processor 124 issues a command to the memory block 112 to ground the wordlines within the memory block 112 to force the memory block 112 into a first read state. In some embodiments, grounding the wordlines includes tying the control gates for the wordlines to a ground potential value. In other embodiments, grounding the wordlines includes tying the control gates to the wordlines to a common source voltage ("Vss"). In one embodiment, the controller 106 controls the wear level mitigation circuitry 142 to force the memory block into the first read state. In other examples, the controller 106 controls the read-write circuitry 140 to force the memory block into the first read state. While grounding the wordlines is described above in regards to forcing the memory block 112 into the first read state, other methods of forcing the memory block 112 into the first read state are also contemplated.

In response to the memory block 112 being forced to into a first read state, the memory block 112 is cycled and the cycle counter associated with the memory block is incremented by the first read state value at block 514. Once the memory block is cycled at block 514, the timer is started again at block 504. By forcing the memory block 112 from a second read state to a first read state prior to performing a cycling operation, the additional wear caused by cycling a memory block while in the second read state is mitigated. Thus, a reduction of 15-20% in FBC can be achieved using the process 500.

Figure 6:
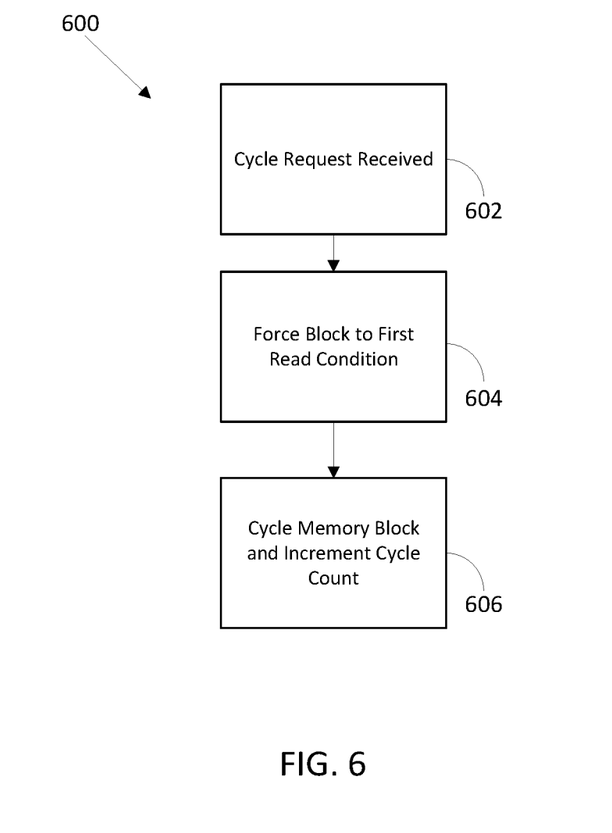
FIG. 6 is a flow chart illustrating an alternative process for forcing a memory block from a second read state to a first read state, according to some embodiments.

Turning now to FIG. 6, an alternative process 600 for forcing the memory block 112 into a first read state is described, according to some embodiments. Similar to the process 500 described above, the process 600 can be used in lieu of, or in conjunction with, the process 400. For example, process 600 can be used once the memory blocks of the data storage device 102 are approaching their end of life, to prevent accelerating wear from performing cycling operations of a memory block while the memory block is in the second read state. In other examples, the process 600 can be used when the temperature of the memory device is below a threshold temperature (e.g. 55° C.) due to the longer transition times from a second read state to a first read state. While 55° C. is used as an example, it is understood that process 600 can be used in lieu of process 400 for temperatures below 55° C. or above 55° C. Furthermore, in some embodiments the process 600 is stored in a memory, such as memory 126 and wear level mitigation 130, and executed by a processor, such as the processor 124. However, in other examples, the process 500 is stored and performed on the memory device 104, such as via the wear level mitigation circuitry 142 and/or the read/write circuitry 140. In still further examples, the process 500 may be performed by a combination of the controller 106 and the memory device 104 (e.g., via the wear-level mitigation circuitry 142 and/or the read/write circuitry 140).

At block 602, a cycle request is received for a given memory block, such as memory block 112. Once the cycle request is received, the processor 124 forces the memory block 112 into the first read state at block 604. As described above, the processor 124 can force the memory block 112 into a first read state by grounding the wordlines within the memory block 112 to force the memory block 112 into a first read state. In one embodiment, the controller 106 controls the wear level mitigation circuitry 142 to force the memory block into a first read state. In other examples, the controller 106 controls the read-write circuitry 140 to force the memory block into a first read state. In some embodiments, grounding the wordlines includes tying the control gates for the wordlines to a ground potential value. In other embodiments, grounding the wordlines includes tying the control gates to the wordlines to a steady-stated voltage ("Vss"). While grounding the wordlines is described above in regards to forcing the memory block 112 into a first read state, other methods of forcing the memory block 112 into a first read state are also contemplated.

In response to the memory block being forced to into a first read state, the memory block 112 is cycled and the cycle counter associated with the memory block is incremented by the first read state value (e.g., "1") at block 606.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
    a non-volatile memory device including a memory block; and
    a controller coupled to the non-volatile memory device and configured to:
        receive a cycle operation request;
        perform a wear-level mitigation operation in response to receiving the cycle operation request, wherein to perform the wear-level mitigation operation, the controller is further configured to:
            determine whether the memory block is in a first read state or a second read state;
            perform the requested cycle operation and increment a cycle count of the memory block by a first value in response to determining that the memory block is in the first read state; and
            perform the requested cycle operation of the memory block and increment the cycle count of the memory block by a second value in response to determining that the memory block is in the second read state; and
        wherein the first read state of the memory block and the second read state of the memory block are based on a wordline voltage that is associated with the memory block.

2. The data storage device of claim 1, wherein the first value is 1 and the second value is a value greater than 1.

3. The data storage device of claim 2, wherein the second value is 1.2.

4. The data storage device of claim 1, wherein the non-volatile memory device includes wear-level mitigation circuitry, and wherein, to perform the wear-level mitigation operation, the controller is further configured to:
    determine whether the memory block is in the first read state or the second read state,
    perform the requested cycle operation and increment a cycle count of the memory block by a value of 1 in response to determining that the memory block is in the first read state;
    control the wear-level mitigation circuitry to force the memory block from the second read state to the first read state; and
    perform the requested cycle operation of the memory block and increment the cycle count of the memory block by 1 in response to controlling the wear-level mitigation circuitry to force the memory block from the second read state to the first read state.

5. The data storage device of claim 4, wherein the wear-level mitigation operation is performed based on a temperature of the data storage device being below a predetermined threshold.

6. The data storage device of claim 1, wherein the non-volatile memory device includes a wear-level mitigation circuitry, and
    wherein, to perform the wear-level mitigation operation, the controller is further configured to:
        control the wear-level mitigation circuitry to force the memory block to the first read state;
        perform the requested cycle operation of the memory block in response to controlling the wear-level mitigation circuitry to force the memory block to the first read state; and
        increment the cycle count of the memory block.

7. The data storage device of claim 1, wherein the controller is further configured to determine the wordline voltage based on one or more of a period of time since a read operation of the memory block was last performed and a temperature of the data storage device.

8. The data storage device of claim 7, wherein the controller is further configured to determine the memory block is in the second read state when the wordline voltage associated with the memory block is equal to or greater than four volts (V).

9. A method performed by a controller coupled to a non-volatile memory device, the method comprising:
    receiving a cycle operation request; and
    performing a wear-level mitigation operation in response to receiving the cycle operation request,
    wherein performing the wear-level mitigation operation comprises:
        determining whether the memory block is in a first read state or a second read state,
        performing the requested cycle operation of the memory block and increment a cycle count of the memory block by a first value in response to determining that the memory block is in the first read state; and
        performing the requested cycle operation of the memory block and increment the cycle count of the memory block by a second value in response to determining that the memory block is in the second read state, and wherein the first read state of the memory block and the second read state of the memory block are based on a wordline voltage that is associated with the memory block.

10. The method of claim 9, wherein the first value is 1 and the second value is a value greater than 1.

11. The method of claim 10, wherein the second value is 1.2.

12. The method of claim 9, wherein the non-volatile memory device includes a wear-level mitigation circuitry, and wherein, performing the wear-level mitigation operation further comprises:
    determining whether the memory block is in the first read state or the second read state;
    performing the requested cycle operation and incrementing a cycle count of the memory block by a value of 1 in response to determining that the memory block is in the first read state;
    controlling the wear-level mitigation circuitry to force the memory block from the second read state to the first read state; and
    performing the requested cycle operation of the memory block and incrementing the cycle count of the memory bock by 1 in response to controlling the wear-level mitigation circuitry to force the memory block to the first read state.

13. The method of claim 12, wherein the wear-level mitigation operation is performed based on one or more a cycle count of the memory block and a temperature of the data storage device.

14. The method of claim 9, wherein the non-volatile memory device includes a wear-level mitigation circuitry, and wherein performing the wear-level mitigation operation comprises:
    controlling the wear-level mitigation circuitry to force the memory block to the first read state;
    performing the requested cycle operation of the memory block in response to controlling the wear-level mitigation circuitry to force the memory block to the first read state; and
    incrementing the cycle count of the memory block.

15. An apparatus, comprising:
    means for receiving a request to cycle a memory block, wherein the memory block is within a non-volatile memory device of a data storage device; and
    means for performing a wear-level mitigation operation in response to receiving the cycle operation request,
    whereinthe means to perform the wear-level mitigation operation is further configured to:
        determine whether the memory block is in a first read state or a second read state;
        perform the requested cycle operation of the memory block and increment a cycle count of the memory block by a first value in response to determining that the memory block is in the first read state;
        perform the requested cycle operation of the memory block and increment the cycle count of the memory block by a second value in response to determining that the memory block is in the second read state, and
    wherein the first read state of the memory block and the second read state of the memory block are based on a wordline voltage that is associated with the memory block.

16. The apparatus of claim 15, wherein the first value is 1 and the second value is a value greater than 1.

17. The apparatus of claim 16, wherein the second value is 1.2.

18. The apparatus of claim 15, wherein the non-volatile memory device includes a wear-level mitigation circuitry, and wherein the means to perform the wear-level mitigation operation is further configured to:
    determine whether the memory block is in the first read state or the second read state,
    perform the requested cycle operation and increment a cycle count of the memory block by a value of 1 in response to determining that the memory block is in the first read state;
    control the wear-level mitigation circuitry to force the memory block from the second read state to the first read state; and
    perform the requested cycle operation of the memory block and increment the cycle count of the memory block by 1 in response to controlling the wear-level mitigation circuitry to force the memory block to the first read state.

19. The apparatus of claim 18, wherein the wear-level mitigation operation is performed based on a temperature of the data storage device being below a predetermined threshold.

20. The apparatus of claim 15, wherein the non-volatile memory device includes a wear-level mitigation circuitry, and wherein the means to perform the wear-level mitigation operation is further configured to:
    control the wear-level mitigation circuitry to force the memory block to the first read state;
    perform the requested cycle operation of the memory block in response to controlling the wear-level mitigation circuitry to force the memory block to the first read state; and
    increment the cycle count of the memory block.

* * * * *